United States Patent
Kim et al.

(10) Patent No.: US 10,373,027 B1
(45) Date of Patent: Aug. 6, 2019

(54) METHOD FOR ACQUIRING SAMPLE IMAGES FOR INSPECTING LABEL AMONG AUTO-LABELED IMAGES TO BE USED FOR LEARNING OF NEURAL NETWORK AND SAMPLE IMAGE ACQUIRING DEVICE USING THE SAME

(71) Applicant: Stradvision, Inc., Pohang (KR)

(72) Inventors: Kye-Hyeon Kim, Seoul (KR); Yongjoong Kim, Pohang-si (KR); Insu Kim, Pohang-si (KR); Hak-Kyoung Kim, Pohang-si (KR); Woonhyun Nam, Pohang-si (KR); SukHoon Boo, Anyang-si (KR); Myungchul Sung, Pohang-si (KR); Donghun Yeo, Pohang-si (KR); Wooju Ryu, Pohang-si (KR); Taewoong Jang, Seoul (KR); Kyungjoong Jeong, Pohang-si (KR); Hongmo Je, Pohang-si (KR); Hojin Cho, Pohang-si (KR)

(73) Assignee: STRADVISION, INC., Pohang (KR)

( * ) Notice: Subject to any disclaimer, the term of this patent is extended or adjusted under 35 U.S.C. 154(b) by 0 days.

(21) Appl. No.: 16/262,142

(22) Filed: Jan. 30, 2019

(51) Int. Cl.
*G06K 9/00* (2006.01)
*G06K 9/62* (2006.01)
(Continued)

(52) U.S. Cl.
CPC .......... *G06K 9/6262* (2013.01); *G06K 9/628* (2013.01); *G06K 9/6232* (2013.01);
(Continued)

(58) Field of Classification Search
CPC .... G06K 9/6262; G06K 9/628; G06K 9/6277; G06K 9/6232; G06K 9/6257; G06N 3/084; G06N 3/04
See application file for complete search history.

(56) References Cited

U.S. PATENT DOCUMENTS 10,007,865 B1 *  6/2018  Kim ................... G06K 9/6231
10,169,679 B1 *  1/2019  Kim ................... G06K 9/6256
(Continued)

OTHER PUBLICATIONS

Badrinarayanan et al., SegNet: A Deep Convolutional Encoder-Decoder Architecture for Image Segmentation, IEEE Transactions on Pattern Analysis and Machine Intelligence, Dec. 2017.*
(Continued)

*Primary Examiner* — John B Strege
(74) *Attorney, Agent, or Firm* — Xsensus, LLP (57) ABSTRACT

A method for acquiring a sample image for label-inspecting among auto-labeled images for learning a deep learning network, optimizing sampling processes for manual labeling, and reducing annotation costs is provided. The method includes steps of: a sample image acquiring device, generating a first and a second images, instructing convolutional layers to generate a first and a second feature maps, instructing pooling layers to generate a first and a second pooled feature maps, and generating concatenated feature maps; instructing a deep learning classifier to acquire the concatenated feature maps, to thereby generate class information; and calculating probabilities of abnormal class elements in an abnormal class group, determining whether the auto-labeled image is a difficult image, and selecting the auto-labeled image as the sample image for label-inspecting. Further, the method can be performed by using a robust algorithm with multiple transform pairs. By the method, hazardous situations are detected more accurately.

26 Claims, 3 Drawing Sheets

(51) Int. Cl.
*G06N 3/04* (2006.01)
*G06N 3/08* (2006.01)
(52) U.S. Cl.
CPC ......... *G06K 9/6257* (2013.01); *G06K 9/6277* (2013.01); *G06N 3/04* (2013.01); *G06N 3/084* (2013.01)

(56) References Cited

U.S. PATENT DOCUMENTS

| | | | | |
|---|---|---|---|---|
| 10,198,671 | B1* | 2/2019 | Yang | G06K 9/6269 |
| 10,223,610 | B1* | 3/2019 | Akselrod-Ballin | G06K 9/6218 |
| 10,223,614 | B1* | 3/2019 | Kim | G06K 9/6262 |
| 10,229,346 | B1* | 3/2019 | Kim | G06K 9/6262 |
| 2016/0148079 | A1* | 5/2016 | Shen | G06K 9/4628 382/157 |
| 2017/0011281 | A1* | 1/2017 | Dijkman | G06K 9/66 |
| 2017/0124409 | A1* | 5/2017 | Choi | G06N 3/0454 |
| 2017/0124415 | A1* | 5/2017 | Choi | G06N 3/08 |
| 2017/0169315 | A1* | 6/2017 | Vaca Castano | G06K 9/3233 |
| 2017/0206431 | A1* | 7/2017 | Sun | G06N 3/084 |
| 2018/0096457 | A1* | 4/2018 | Savvides | G06K 9/6267 |
| 2018/0137642 | A1* | 5/2018 | Malisiewicz | G06T 7/11 |
| 2018/0211403 | A1* | 7/2018 | Hotson | G06K 9/4604 |
| 2018/0268234 | A1* | 9/2018 | Yang | G06N 3/063 |
| 2018/0373963 | A1* | 12/2018 | Lo | G06N 3/0454 |
| 2019/0012548 | A1* | 1/2019 | Levi | G06K 9/00791 |
| 2019/0050673 | A1* | 2/2019 | Ukil | G06K 9/623 |
| 2019/0050681 | A1* | 2/2019 | Tate | G06K 9/6232 |
| 2019/0073553 | A1* | 3/2019 | Yao | G06K 9/46 |

OTHER PUBLICATIONS

Sun et al., Face detection using deep learning: an improved faster RCNN approach, Elsevier B.V., Mar. 2018.*
Ren et al., Faster R-CNN: Towards Real-Time Object Detection with Region Proposal Networks, 2015.*
Du et al., Fused DNN: A deep neural network fusion approach to fast and robust pedestrian detection, IEEE, 2017.*
Girshick et al., Fast R-CNN, 2015.*

* cited by examiner

METHOD FOR ACQUIRING SAMPLE IMAGES FOR INSPECTING LABEL AMONG AUTO-LABELED IMAGES TO BE USED FOR LEARNING OF NEURAL NETWORK AND SAMPLE IMAGE ACQUIRING DEVICE USING THE SAME

FIELD OF THE DISCLOSURE

The present disclosure relates to a method and a device for acquiring at least one sample image for label-inspecting among at least one auto-labeled image for learning a deep learning network.

BACKGROUND OF THE DISCLOSURE

Recently, methods of performing object identification and the like using machine learning are being studied. As one of the machine learning, a deep learning, which uses a neural network with several hidden layers between an input layer and an output layer, shows high recognizing performance.

And, the neural network using the deep learning generally learns through backpropagation using losses.

In order to perform learning of such a deep learning network, training data in which tags are added to individual data points by labelers are needed. Preparing this training data (i.e. classifying the data correctly) can be very labor-intensive, expensive and inconvenient, especially if a large amount of training data is to be used and if the quality of the data pre-preparation is not consistently high. Conventional interactive labeling can be computationally expensive and fail to deliver good results.

Therefore, in recent years, auto-labeling which adds tags, i.e., labels, to a training image using a deep learning-based auto labeling device is performed, and inspectors inspect auto-labeled training image to correct the tags or the labels.

However, in such a conventional method, a throughput of the inspectors is low as compared with the throughput of the auto-labeling device. Therefore, it takes a long time to generate true labels for entire training images. In order to improve the overall throughput, the number of the inspectors must be increased, but this also increases the cost.

Also, it is difficult to acquire a large number of the inspectors skilled enough to handle the throughput of the auto-labeling device.

SUMMARY OF THE DISCLOSURE

It is an object of the present disclosure to solve all the aforementioned problems.

It is another object of the present disclosure to improve a labeling throughput of entire training images by auto-labeling.

It is still another object of the present disclosure to maintain a maximal throughput of the auto-labeling, while reducing the number of inspectors.

It is still yet another object of the present disclosure to allow unskilled inspectors to perform label-inspecting keeping up with a throughput of the auto-labeling device.

In addition, recordable media that are readable by a computer for storing a computer program to execute the method of the present disclosure is further provided.

In accordance with one aspect of the present disclosure, there is provided a method for acquiring at least one sample image for label-inspecting among at least one auto-labeled image for learning a deep learning network, including steps of: (a) a sample image acquiring device, if the auto-labeled image labeled by an auto-labeling network is acquired, (i) generating a first image and a second image, at least one of which is transformed from the auto-labeled image, wherein if only one of the first image and the second image is transformed from the auto-labeled image then the other is the auto-labeled image used as is, (ii) instructing one or more convolutional layers to generate at least one first feature map and at least one second feature map by respectively applying one or more convolution operations to the first image and the second image, (iii) instructing one or more pooling layers to generate each of first pooled feature maps by respectively applying one or more pooling operations to each region, corresponding to each of auto-labeled boxes of the auto-labeled image, on the first feature map, and to generate each of second pooled feature maps by respectively applying the pooling operations to each region, corresponding to each of the auto-labeled boxes of the auto-labeled image, on the second feature map, and (iv) generating each of concatenated feature maps, corresponding to each of the auto-labeled boxes by concatenating each of the first pooled feature maps and each of the second pooled feature maps respectively corresponding to said each of the auto-labeled boxes; (b) the sample image acquiring device instructing a deep learning classifier to acquire each of the concatenated feature maps as its input, to thereby generate class information which classifies each of the auto-labeled boxes into an abnormal class group or a normal class group; and (c) the sample image acquiring device (i) calculating each of one or more probabilities of each of abnormal class elements in the abnormal class group by referring to each piece of the class information on each of the auto-labeled boxes, (ii) determining whether the auto-labeled image is a difficult image by using each of the probabilities of each of the abnormal class elements, and (iii) selecting the auto-labeled image as the sample image for label-inspecting if the auto-labeled image is determined as the difficult image, wherein the difficult image represents an image which has a probability of being automatically labeled incorrectly larger than or equal to a predetermined value.

As one example, at the step of (a), the sample image acquiring device, in a process of generating the first image and the second image, generates at least one image pair of the first image and the second image corresponding to the auto-labeled image by using one or more transformation pairs which include one or more first functions for transforming the first image and their corresponding second functions for transforming the second image, and, at the step of (c), the sample image acquiring device, for each of the auto-labeled boxes, calculates each of probabilities of each of the abnormal class elements corresponding to each of the transformation pairs and calculates at least one weighted average over said each of probabilities.

As one example, the abnormal class group includes a misdetection class group and a non-detection class group, and each of probabilities of each of the abnormal class elements includes each of probabilities of each of misdetection class elements in the misdetection class group and each of probabilities of each of non-detection class elements in the non-detection class group.

As one example, at the step of (c), the probability of being automatically labeled incorrectly is at least one generalized mean over each of one or more probabilities of each of the abnormal class elements.

As one example, the predetermined value is a highest hit rate among hit rates for correct answers to validation images which are manually inspected after auto-labeling of the auto-labeling network.

As one example, the method further includes a step of: (d) the sample image acquiring device identifying regions, corresponding to the auto-labeled boxes classified into the abnormal class group, on the auto-labeled image determined as the difficult image.

As one example, each of the convolutional layers is at least one auto-labeling convolutional layer in the auto-labeling network.

As one example, the deep learning classifier includes multiple fully connected layers or a fully convolutional network.

As one example, a learning device has instructed the deep learning classifier to complete processes of (i) if at least one training image including true boxes and auto-boxes corresponding to the auto-labeled boxes is acquired, (i-1) instructing a convolutional layer for training to generate a feature map for training by applying its convolution operations to the training image, and (i-2) instructing a pooling layer for training to generate pooled feature maps for training by applying its pooling operation to each of regions, corresponding to the auto-boxes, on the feature map for training, (ii) acquiring each of the pooled feature maps for training corresponding to each of the auto-boxes as its input and to generate the class information which classifies the auto-boxes into the abnormal class group or the normal class group, and (iii) instructing at least one loss layer to calculate one or more losses by referring to the class information and one or more ground truths, to thereby learn at least part of parameters of the deep learning classifier by backpropagating the losses.

As one example, the class information includes the abnormal class group having a misdetection class group and a non-detection class group, wherein (i) the misdetection class group refers to a case that a first specific true box with the class information same as that of a first specific auto-box does not overlap with any other of the true boxes by a value equal to or greater than a first prescribed threshold and (ii) the non-detection class group refers to a case that, on condition that a second specific auto-box with the class information same as that of a second specific true box does not overlap with any other of the auto-boxes by a value equal to or greater than a second prescribed threshold, a third specific auto-box overlaps with the second specific true box by a value equal to or greater than a third prescribed threshold, and the normal class group includes any other class groups excluding the misdetection class group and the non-detection class group.

As one example, the learning device manages the misdetection class group, the non-detection class group, and the normal class group, such that the number of one of a class group, in the abnormal class group, with more group elements is equal to or less than the number of the other class group, in the abnormal class group, with less group elements multiplied by a predetermined first multiplier, and that the number of group elements of the normal class group is equal to the number of group elements of the abnormal class group multiplied by a predetermined second multiplier.

As one example, the learning device adjusts the number of group elements of the misdetection class group, the number of group elements of the non-detection class group, and the number of group elements of the normal class group by using a random sampling.

As one example, the learning device performs the backpropagating by using a cross-entropy loss.

In accordance with another aspect of the present disclosure, there is provided a sample image acquiring device for acquiring at least one sample image for label-inspecting among at least one auto-labeled image for learning a deep learning network, including: at least one memory that stores instructions; and at least one processor configured to execute the instructions to: perform processes of: (I) if the auto-labeled image labeled by an auto-labeling network is acquired, (i) generating a first image and a second image, at least one of which is transformed from the auto-labeled image, wherein if only one of the first image and the second image is transformed from the auto-labeled image then the other is the auto-labeled image used as is, (ii) instructing one or more convolutional layers to generate at least one first feature map and at least one second feature map by respectively applying one or more convolution operations to the first image and the second image, (iii) instructing one or more pooling layers to generate each of first pooled feature maps by respectively applying one or more pooling operations to each region, corresponding to each of auto-labeled boxes of the auto-labeled image, on the first feature map, and to generate each of second pooled feature maps by respectively applying the pooling operations to each region, corresponding to each of the auto-labeled boxes of the auto-labeled image, on the second feature map, and (iv) generating each of concatenated feature maps, corresponding to each of the auto-labeled boxes by concatenating each of the first pooled feature maps and each of the second pooled feature maps respectively corresponding to said each of the auto-labeled boxes, (II) instructing a deep learning classifier to acquire each of the concatenated feature maps as its input, to thereby generate class information which classifies each of the auto-labeled boxes into an abnormal class group or a normal class group, and (III) (i) calculating each of one or more probabilities of each of abnormal class elements in the abnormal class group by referring to each piece of the class information on each of the auto-labeled boxes, (ii) determining whether the auto-labeled image is a difficult image by using each of the probabilities of each of the abnormal class elements, and (iii) selecting the auto-labeled image as the sample image for label-inspecting if the auto-labeled image is determined as the difficult image, wherein the difficult image represents an image which has a probability of being automatically labeled incorrectly larger than or equal to a predetermined value.

As one example, at the process of (I), the processor, in a process of generating the first image and the second image, generates at least one image pair of the first image and the second image corresponding to the auto-labeled image by using one or more transformation pairs which include one or more first functions for transforming the first image and their corresponding second functions for transforming the second image, and, at the process of (III), the processor, for each of the auto-labeled boxes, calculates each of probabilities of each of the abnormal class elements corresponding to each of the transformation pairs and calculates at least one weighted average over said each of probabilities.

As one example, the abnormal class group includes a misdetection class group and a non-detection class group, and each of probabilities of each of the abnormal class elements includes each of probabilities of each of misdetection class elements in the misdetection class group and each of probabilities of each of non-detection class elements in the non-detection class group.

As one example, at the process of (III), the probability of being automatically labeled incorrectly is at least one generalized mean over each of one or more probabilities of each of the abnormal class elements.

As one example, the predetermined value is a highest hit rate among hit rates for correct answers to validation images which are manually inspected after auto-labeling of the auto-labeling network.

As one example, the processor further performs a process of: (IV) identifying regions, corresponding to the auto-labeled boxes classified into the abnormal class group, on the auto-labeled image determined as the difficult image.

As one example, each of the convolutional layers is at least one auto-labeling convolutional layer in the auto-labeling network.

As one example, the deep learning classifier includes multiple fully connected layers or a fully convolutional network.

As one example, a learning device has instructed the deep learning classifier to complete processes of (i) if at least one training image including true boxes and auto-boxes corresponding to the auto-labeled boxes is acquired, (i-1) instructing a convolutional layer for training to generate a feature map for training by applying its convolution operations to the training image, and (i-2) instructing a pooling layer for training to generate pooled feature maps for training by applying its pooling operation to each of regions, corresponding to the auto-boxes, on the feature map for training, (ii) acquiring each of the pooled feature maps for training corresponding to each of the auto-boxes as its input and to generate the class information which classifies the auto-boxes into the abnormal class group or the normal class group, and (iii) instructing at least one loss layer to calculate one or more losses by referring to the class information and one or more ground truths, to thereby learn at least part of parameters of the deep learning classifier by backpropagating the losses.

As one example, the class information includes the abnormal class group having a misdetection class group and a non-detection class group, wherein (i) the misdetection class group refers to a case that a first specific true box with the class information same as that of a first specific auto-box does not overlap with any other of the true boxes by a value equal to or greater than a first prescribed threshold and (ii) the non-detection class group refers to a case that, on condition that a second specific auto-box with the class information same as that of a second specific true box does not overlap with any other of the auto-boxes by a value equal to or greater than a second prescribed threshold, a third specific auto-box overlaps with the second specific true box by a value equal to or greater than a third prescribed threshold, and the normal class group includes any other class groups excluding the misdetection class group and the non-detection class group.

As one example, the learning device manages the misdetection class group, the non-detection class group, and the normal class group, such that the number of one of a class group, in the abnormal class group, with more group elements is equal to or less than the number of the other class group, in the abnormal class group, with less group elements multiplied by a predetermined first multiplier, and that the number of group elements of the normal class group is equal to the number of group elements of the abnormal class group multiplied by a predetermined second multiplier.

As one example, the learning device adjusts the number of group elements of the misdetection class group, the number of group elements of the non-detection class group, and the number of group elements of the normal class group by using a random sampling.

As one example, the learning device performs the backpropagating by using a cross-entropy loss.

BRIEF DESCRIPTION OF THE DRAWINGS

The above and other objects and features of the present disclosure will become apparent from the following description of preferred embodiments given in conjunction with the accompanying drawings.

The following drawings to be used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

To allow those skilled in the art to carry out the present disclosure easily, the example embodiments of the present disclosure by referring to attached diagrams will be explained in detail as shown below.

Figure 1:
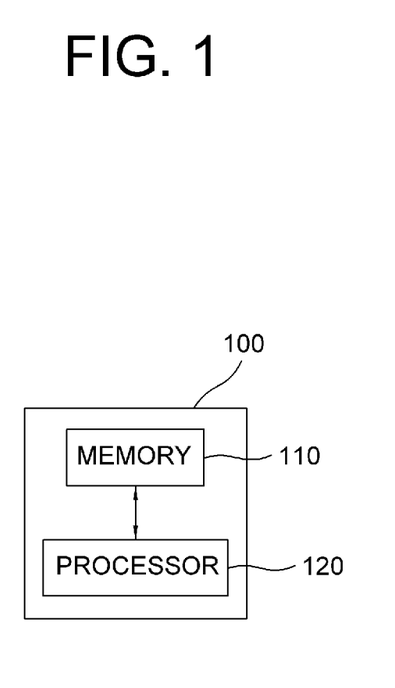
FIG. 1 is a drawing schematically illustrating a sample image acquiring device for acquiring at least one sample image for label-inspecting among one or more auto-labeled images to be used for learning a neural network in accordance with one example of the present disclosure.

FIG. 1 is a drawing schematically illustrating a sample image acquiring device for acquiring at least one sample image for label-inspecting among one or more auto-labeled images to be used for learning a neural network in accordance with one example of the present disclosure. By referring to FIG. 1, the sample image acquiring device 100 may include a memory 110 for storing instructions to acquire the sample image for label-inspecting among the auto-labeled images, and a processor 120 for performing processes to acquire the sample image for label-inspecting among the auto-labeled images corresponding to the instructions in the memory 110.

Specifically, the sample image acquiring device 100 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The processor of the computing device may include hardware configuration of MPU (Micro Processing Unit) or CPU (Central Processing Unit), cache memory, data bus, etc. Additionally, the computing device may further include OS and software configuration of applications that achieve specific purposes.

Such description of the computing device does not exclude an integrated device including any combination of a processor, a memory, a medium, or any other computing components for implementing the present disclosure.

Figure 2:
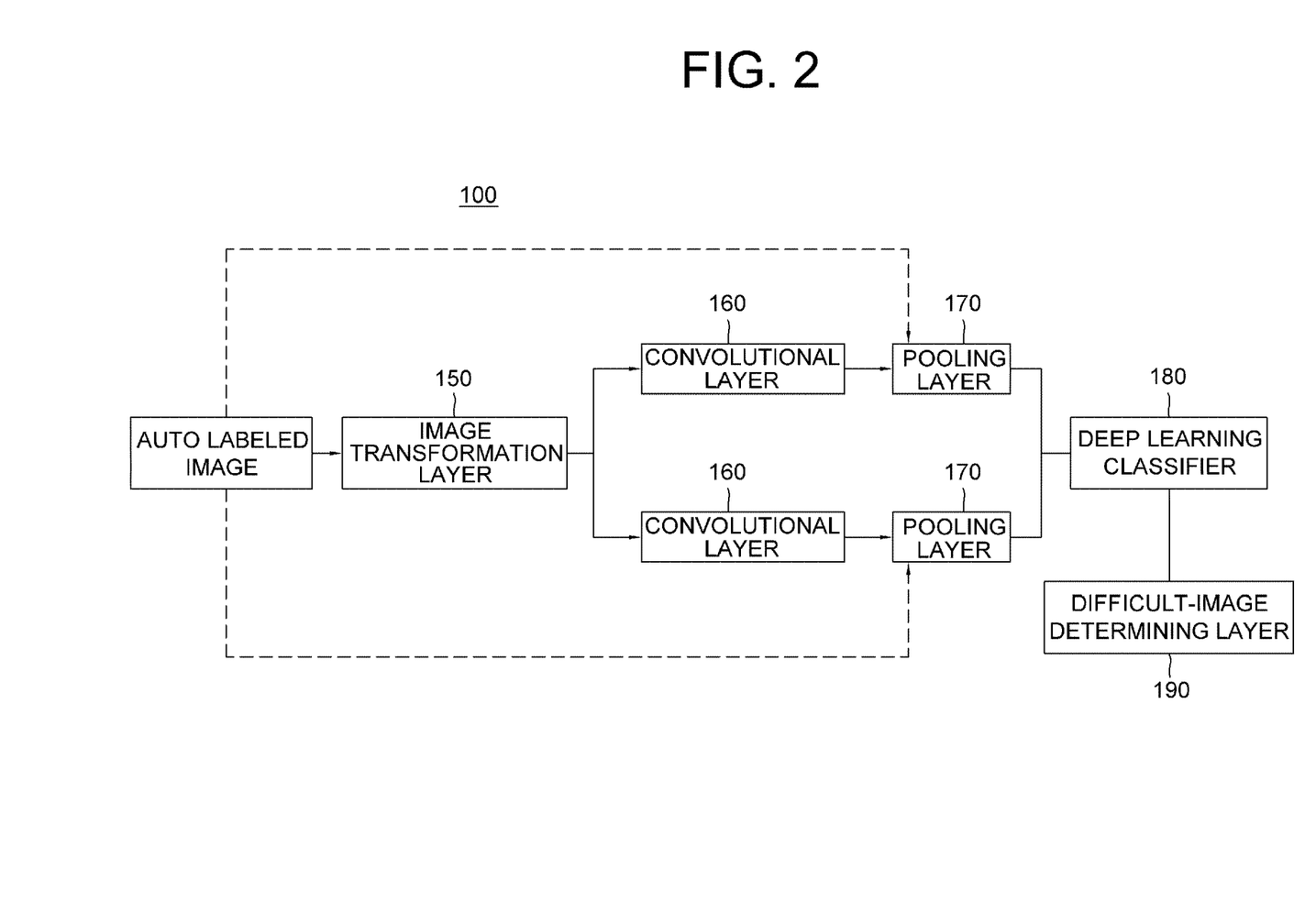
FIG. 2 is a drawing schematically illustrating a method for acquiring the sample image for label-inspecting among the auto-labeled images to be used for learning the neural network in accordance with one example of the present disclosure.

A method for acquiring the sample image for label-inspecting among the auto-labeled images to be used for learning the neural network in accordance with one example of the present disclosure is described by referring to FIG. 2. Herein, the neural network may perform image analysis by using the sample image acquiring device 100.

First, if the auto-labeled image labeled by an auto-labeling network is acquired, the sample image acquiring device 100 may instruct an image transformation layer 150 to generate a first image and a second image by transforming the auto-labeled image or by using the auto-labeled image as is. Herein, at least one of the first image and the second image may be transformed from the auto-labeled image. Also, the auto-labeled images may include validation images having true boxes, and the validation images may be used for evaluating results of auto labeling and manual labeling.

In a process of generating the first image and the second image, the sample image acquiring device 100 may instruct the image transformation layer 150 to generate at least one image pair of the first image and the second image corresponding to the auto-labeled image by using one or more transformation pairs which include one or more first functions for transforming the first image and their corresponding second functions for transforming the second image.

Herein, the transformation pairs may be represented as follows, as one example.

| Index | The first image | The second image |
|-------|-----------------|------------------|
| 1 | Resized 480P | Resized 540P |
| 2 | Resized 640P | Resized 720P |
| 3 | Resized 900P | Resized 1080P |
| 4 | Original | Horizontal flip |
| 5 | Original | Gamma 0.5 |
| 6 | Original | Gamma 1.5 |

That is, more than one image pair of the first image and the second image, corresponding to the transformation pairs set according to the auto-labeled image, may be generated. Six examples of the transformation pairs are described above, but the scope of the present disclosure is not limited thereto, and the number of the transformation pairs may be set as any number.

Next, the sample image acquiring device 100 may instruct one or more convolutional layers 160 to apply one or more convolution operations respectively to the first image and the second image, to thereby generate at least one first feature map and at least one second feature map.

Herein, each of the convolutional layers 160 may be at least one auto-labeling convolutional layer in the auto-labeling network. That is, if the auto-labeling network uses ensemble of multi transforms, the transformation pairs may be defined by using only the transforms used by the auto-labeling network, and as a result, a feature map outputted from the auto-labeling convolutional layer in the auto-labeling network may be used without any further process, thus time required for computation of the feature map is reduced.

Next, the sample image acquiring device 100 may instruct one or more pooling layers 170 to generate each of first pooled feature maps by respectively applying one or more pooling operations to each region, corresponding to each of auto-labeled boxes of the auto-labeled image, on the first feature map, and to generate each of second pooled feature maps by respectively applying the pooling operations to each region, corresponding to each of the auto-labeled boxes of the auto-labeled image, on the second feature map, and to generate each of concatenated feature maps, corresponding to each of the auto-labeled boxes, by concatenating each of the first pooled feature maps and each of the second pooled feature maps respectively corresponding to said each of the auto-labeled boxes.

Herein, although FIG. 2 shows two of the convolutional layers 160 and two of the pooling layers 170, a single convolutional layer and a single pooling layer may be used for the convolution operations on the first image and the second image and for the pooling operations on the first feature map and the second feature map.

Next, the sample image acquiring device 100 may instruct the deep learning classifier 180 to acquire each of the concatenated feature maps as its input, to thereby generate class information which classifies each of the auto-labeled boxes into an abnormal class group or a normal class group.

Herein, the abnormal class group may include a misdetection class group and a non-detection class group, and the normal class group may include a class group for boxes each of which is classified as an object and a class group for boxes each of which is classified as a background, where the boxes are at least part of the auto-labeled boxes that are not in the abnormal class group. Classification of the auto-labeled boxes is described in a learning process of the deep learning classifier as below.

Next, the sample image acquiring device 100 may instruct a difficult-image determining layer 190 to (i) calculate each of one or more probabilities of each of abnormal class elements in the abnormal class group by referring to each piece of the class information on each of the auto-labeled boxes, and (ii) determine whether the auto-labeled image is a difficult image, to be described later, by using each of the probabilities of each of the abnormal class elements.

Herein, a sigmoid function may be applied to outputs of the deep learning classifier and then the probabilities of each of the abnormal class elements may be calculated. The probabilities of each of the abnormal class elements may include each of probabilities of misdetection class elements in the misdetection class group and each of probabilities of non-detection class elements in the non-detection class group.

As one example, the probabilities of the misdetection class elements FP may be represented by $p(b_i:FP|I_A, I_B)$ and the probabilities of the non-detection class elements FN may be represented by $p(b_i:FN|I_A, I_B)$.

Herein, $b_i$ may be one of the auto-labeled boxes, $I_A$ may be the first image, and $I_B$ may be the second image.

Also, for each of the auto-labeled boxes, the sample image acquiring device 100 may calculate each of the probabilities of each of the abnormal class elements corresponding to each of the transformation pairs and may calculate at least one weighted average over said each of the probabilities of each of the abnormal class elements.

That is, the probabilities $p(b_i:FP)$ of the misdetection class elements and the probabilities $p(b_i:FN)$ of the non-detection class elements may be expressed as follows.

$$p(b_i:FP) = \frac{1}{\sum_j w_j} \sum_j w_j p(b_i:FP|I_{A_j}, I_{B_j})$$

$$p(b_i:FN) = \frac{1}{\sum_j w_j} \sum_j w_j p(b_i:FN|I_{A_j}, I_{B_j})$$

Herein, because the probabilities $p(b_i:FP)$ of the misdetection class elements and the probabilities $p(b_i:FN)$ of the non-detection class elements are linear functions of weights, the weights may be optimized by using a constrained optimization with constraints $\Sigma_j w_j = 1$.

Thereafter, if at least one generalized mean over each of the probabilities of each of the abnormal class elements is equal to or greater than a predetermined value, the sample image acquiring device 100 may determine the auto-labeled image as the difficult image.

As one example, the sample image acquiring device 100 may calculate each of probabilities (p(I:Difficult)), by using the following generalized mean, of the auto-labeled image being the difficult image, by referring to each of the probabilities $p(b_i:FP)$ of the misdetection class elements and each of the probabilities $p(b_i:FN)$ of the non-detection class elements of each of the auto-labeled boxes.

$$p(I:\text{Difficult}) = \left( \frac{1}{N_I} \sum_{b_i \in B_I} p(b_i:FP)^p + \frac{1}{N_I} \sum_{b_i \in B_I} p(b_i:FN)^p \right)^{1/p} \geq \gamma$$

And, if each of the probabilities (p(I:Difficult)) calculated by referring to each of the probabilities $p(b_i:FP)$ of the misdetection class elements and each of the probabilities $p(b_i:FN)$ of the non-detection class elements of each of the auto-labeled boxes is determined as larger than or equal to the predetermined value, the sample image acquiring device 100 may determine the auto-labeled image as the difficult image. Herein, the difficult image represents an image which has a probability of being automatically labeled incorrectly larger than or equal to the predetermined value.

Herein, the predetermined value may be a highest hit rate among hit rates for correct answers to the validation images which are manually inspected after auto-labeling of the auto-labeling network.

Next, if the auto-labeled image is determined as the difficult image, the sample image acquiring device 100 may select the auto-labeled image as the sample image for label-inspecting.

Then, the sample image acquiring device 100 may identify regions, corresponding to the auto-labeled boxes classified into the abnormal class group, on the auto-labeled image determined as the difficult image, for easy inspection of an inspector.

Figure 3:
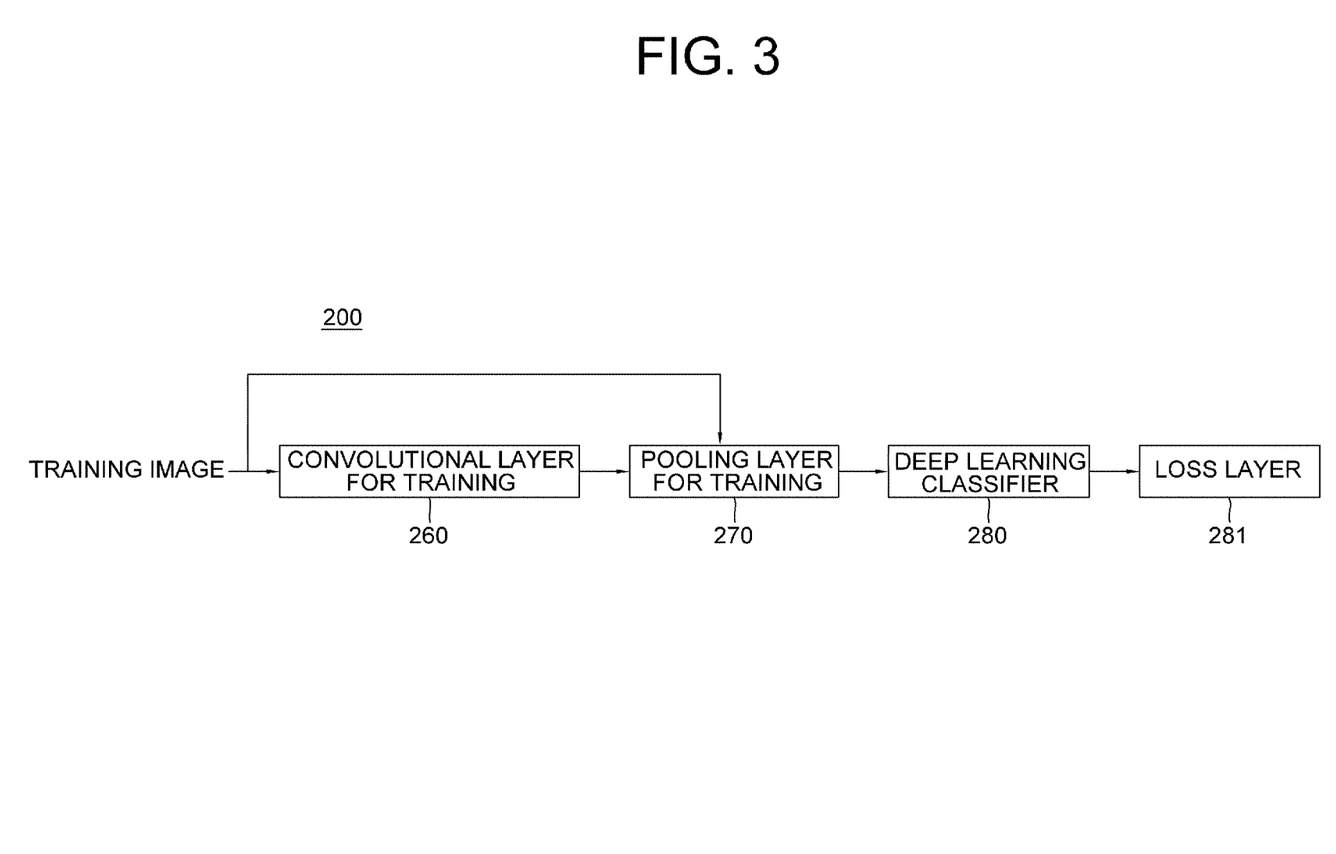
FIG. 3 is a drawing schematically illustrating a method for learning a deep learning classifier which categorizes classes of auto-labeled boxes on the auto-labeled images to be used for learning the neural network in accordance with one example of the present disclosure.

Meanwhile, the deep learning classifier may include multiple fully connected layers or a fully convolutional network, and a process of learning the deep learning classifier is described by referring to FIG. 3 as below.

First, if at least one training image with auto-boxes labeled by the auto-labeling network is acquired, a learning device 200 may instruct a convolutional layer 260 for training to apply its convolution operations to the training image, to thereby generate a feature map for training.

Herein, the auto-boxes on the training image may be generated arbitrarily for training, unlike the auto-boxes labeled by the auto-labeling network.

Also, the learning device 200 may include a memory (not illustrated) for storing instructions to learn the deep learning class classifier, and a processor (not illustrated) for performing learning of the deep learning class classifier corresponding to the instructions in the memory.

Specifically, the learning device 200 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software. The processor of the computing device may include hardware configuration of MPU (Micro Processing Unit) or CPU (Central Processing Unit), cache memory, data bus, etc. Additionally, the computing device may further include OS and software configuration of applications that achieve specific purposes. Such description of the computing device does not exclude an integrated device including any combination of a processor, a memory, a medium, or any other computing components for implementing the present disclosure.

Next, the learning device 200 may instruct a pooling layer 270 for training to generate pooled feature maps for training by respectively applying its pooling operations to each of regions, corresponding to the auto-boxes, on the feature map for training.

Then, the learning device 200 may instruct the deep learning classifier 280 to acquire each of the pooled feature maps for training corresponding to each of the auto-boxes as its input and to generate the class information which classifies the auto-boxes into the abnormal class group or the normal class group.

Herein, the class information may include the abnormal class group having the misdetection class group and the non-detection class group. And the class information may include two dimensional outputs.

As one example, the misdetection class group (FP, $y_i$=[1, 0]) may refer to a case that a first specific true box with the class information same as that of a first specific auto-box does not overlap with any other of the true boxes by a value equal to or greater than a first prescribed threshold.

Herein, the misdetection class group (FP, $y_i$=[1,0]) may be represented as $$\max_{t_j : c[b_i] = c[t_j]} IoU(b_i, t_j) < \alpha.$$

And the non-detection class group (FN, $y_i$=[0,1]) may refer to a case that, on condition that a second specific auto-box with the class information same as that of a second specific true box does not overlap with any other of the auto-boxes by a value equal to or greater than a second prescribed threshold, a third specific auto-box overlaps with the second specific true box by a value equal to or greater than a third prescribed threshold.

Herein, the non-detection class group (FN, $y_i$=[0,1]) may be represented as $$\max_{b_i : c[b_i] = c[t_j]} IoU(b_i, t_j) < \alpha,$$

As one example, it may be configured such that $\alpha$=0.9 and $\beta$=0.5, but the scope of the present disclosure is not limited thereto.

And the normal class group ($y_i$=[0,0]) may include any other class groups excluding the misdetection class group and the non-detection class group, and may correspond to the objects and the background.

Meanwhile, to prevent an imbalance of the classes, the learning device 200 may manage the misdetection class group, the non-detection class group, and the normal class group, such that the number of one of a class group, in the abnormal class group, with more group elements is equal to or less than the number of the other class group, in the abnormal class group, with less group elements multiplied by a predetermined first multiplier, and that the number of group elements of the normal class group is equal to the number of group elements of the abnormal class group multiplied by a predetermined second multiplier.

Herein, the learning device 200 may adjust the number of group elements of the misdetection class group FP, the number of group elements of the non-detection class group FN, and the number of group elements of the normal class group by using a random sampling.

Then, the learning device 200 may instruct at least one loss layer 281 to calculate one or more losses by referring to each piece of the class information on each of the auto-labeled boxes and its corresponding ground truth, to thereby learn at least part of parameters of the deep learning classifier 280 by backpropagating the losses.

Herein, the learning device 200 may perform the backpropagating by using a cross-entropy loss.

Meanwhile, the learning may mean adjustment of weights which are synaptic strengths of any of two connected layers in a neural network in the deep learning classifier 280, such that the losses become smaller.

As one example, if the backpropagating is performed by using a stochastic gradient descent (SGD), each of the weights may be adjusted as follows.

$$\Delta w_{ij}(t+1) = \Delta w_{ij}(t) + lr \frac{\partial C}{\partial w_{ij}}$$

lr may depict a learning rate and C may depict a cost function.

Herein, the cost function may be determined by referring to factors like types of learning, e.g., supervised learning, unsupervised learning, and reinforcement learning, and an activation function, etc.

For example, if a learning to solve a multi-class classification problem is performed, a softmax function and a cross-entropy function may be used respectively for the activation function and the cost function in general.

The softmax function may be represented as $$p_j = \frac{\exp(x_j)}{\sum_k \exp(x_k)},$$

and the cost function may be represented as $C = -\Sigma_j d_j \log(p_j)$.

Herein, $p_j$ may depict a class probability, and $x_j$ and $x_k$ may depict respectively a total input into a unit j and the total input into a unit k. And, $d_j$ may depict a target probability of an output unit j, and $p_j$ may depict a probability output of the output unit j after its corresponding activation function is applied.

The above example of the backpropagating the losses shows the stochastic gradient descent (SGD), however, the scope of the present disclosure is not limited thereto, and the backpropagating for learning of the neural network may be performed by using a momentum, a Nesterov's Accelerated Gradient (NAG), an AdaGrad (Adaptive Gradient), an RMSProp, an AdaDelta (Adaptive Delta), or an Adam (Adaptive Moment Estimation).

The present disclosure has an effect of reducing time of inspection by selectively inspecting images that are difficult to label among images automatically labeled by the auto-labeling device.

The present disclosure has another effect of increasing a throughput of labeling the entire training images by allowing an unskilled inspector to keep up with a throughput from the auto-labeling network via inspecting the images that are difficult to label.

The present disclosure has still another effect of optimizing sampling processes for the manual labeling and reducing annotation costs by reducing the number of inspectors via inspecting the images that are difficult to label.

Further, the method can be performed by using a robust algorithm with multiple transform pairs.

By the present disclosure, hazardous situations may be detected more accurately.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for acquiring at least one sample image for label-inspecting among at least one auto-labeled image for learning a deep learning network, comprising steps of:
    (a) a sample image acquiring device, if the auto-labeled image labeled by an auto-labeling network is acquired, (i) generating a first image and a second image, at least one of which is transformed from the auto-labeled image, wherein if only one of the first image and the second image is transformed from the auto-labeled image then the other is the auto-labeled image used as is, (ii) instructing one or more convolutional layers to generate at least one first feature map and at least one second feature map by respectively applying one or more convolution operations to the first image and the second image, (iii) instructing one or more pooling layers to generate each of first pooled feature maps by respectively applying one or more pooling operations to each region, corresponding to each of auto-labeled boxes of the auto-labeled image, on the first feature map, and to generate each of second pooled feature maps by respectively applying the pooling operations to each region, corresponding to each of the auto-labeled boxes of the auto-labeled image, on the second feature map, and (iv) generating each of concatenated feature maps, corresponding to each of the auto-labeled boxes by concatenating each of the first pooled feature maps and each of the second pooled feature maps respectively corresponding to said each of the auto-labeled boxes;
    (b) the sample image acquiring device instructing a deep learning classifier to acquire each of the concatenated feature maps as its input, to thereby generate class information which classifies each of the auto-labeled boxes into an abnormal class group or a normal class group; and
    (c) the sample image acquiring device (i) calculating each of one or more probabilities of each of abnormal class elements in the abnormal class group by referring to each piece of the class information on each of the auto-labeled boxes, (ii) determining whether the auto-labeled image is a difficult image by using each of the probabilities of each of the abnormal class elements, and (iii) selecting the auto-labeled image as the sample image for label-inspecting if the auto-labeled image is determined as the difficult image, wherein the difficult image represents an image which has a probability of being automatically labeled incorrectly larger than or equal to a predetermined value.

2. The method of claim 1, wherein, at the step of (a), the sample image acquiring device, in a process of generating the first image and the second image, generates at least one image pair of the first image and the second image corresponding to the auto-labeled image by using one or more transformation pairs which include one or more first functions for transforming the first image and their corresponding second functions for transforming the second image, and
    wherein, at the step of (c), the sample image acquiring device, for each of the auto-labeled boxes, calculates each of probabilities of each of the abnormal class elements corresponding to each of the transformation pairs and calculates at least one weighted average over said each of probabilities.

3. The method of claim 1, wherein the abnormal class group includes a misdetection class group and a non-detection class group, and each of probabilities of each of the abnormal class elements includes each of probabilities of each of misdetection class elements in the misdetection class group and each of probabilities of each of non-detection class elements in the non-detection class group.

4. The method of claim 1, wherein, at the step of (c), the probability of being automatically labeled incorrectly is at least one generalized mean over each of one or more probabilities of each of the abnormal class elements.

5. The method of claim 1, wherein the predetermined value is a highest hit rate among hit rates for correct answers to validation images which are manually inspected after auto-labeling of the auto-labeling network.

6. The method of claim 1, wherein the method further comprises a step of:
    (d) the sample image acquiring device identifying regions, corresponding to the auto-labeled boxes classified into the abnormal class group, on the auto-labeled image determined as the difficult image.

7. The method of claim 1, wherein each of the convolutional layers is at least one auto-labeling convolutional layer in the auto-labeling network.

8. The method of claim 1, wherein the deep learning classifier includes multiple fully connected layers or a fully convolutional network.

9. The method of claim 1, wherein a learning device has instructed the deep learning classifier to complete processes of (i) if at least one training image including true boxes and auto-boxes corresponding to the auto-labeled boxes is acquired, (i-1) instructing a convolutional layer for training to generate a feature map for training by applying its convolution operations to the training image, and (i-2) instructing a pooling layer for training to generate pooled feature maps for training by applying its pooling operation to each of regions, corresponding to the auto-boxes, on the feature map for training, (ii) acquiring each of the pooled feature maps for training corresponding to each of the auto-boxes as its input and to generate the class information which classifies the auto-boxes into the abnormal class group or the normal class group, and (iii) instructing at least one loss layer to calculate one or more losses by referring to the class information and one or more ground truths, to thereby learn at least part of parameters of the deep learning classifier by backpropagating the losses.

10. The method of claim 9, wherein the class information includes the abnormal class group having a misdetection class group and a non-detection class group,
wherein (i) the misdetection class group refers to a case that a first specific true box with the class information same as that of a first specific auto-box does not overlap with any other of the true boxes by a value equal to or greater than a first prescribed threshold and (ii) the non-detection class group refers to a case that, on condition that a second specific auto-box with the class information same as that of a second specific true box does not overlap with any other of the auto-boxes by a value equal to or greater than a second prescribed threshold, a third specific auto-box overlaps with the second specific true box by a value equal to or greater than a third prescribed threshold, and the normal class group includes any other class groups excluding the misdetection class group and the non-detection class group.

11. The method of claim 10, wherein the learning device manages the misdetection class group, the non-detection class group, and the normal class group, such that the number of one of a class group, in the abnormal class group, with more group elements is equal to or less than the number of the other class group, in the abnormal class group, with less group elements multiplied by a predetermined first multiplier, and that the number of group elements of the normal class group is equal to the number of group elements of the abnormal class group multiplied by a predetermined second multiplier.

12. The method of claim 10, wherein the learning device adjusts the number of group elements of the misdetection class group, the number of group elements of the non-detection class group, and the number of group elements of the normal class group by using a random sampling.

13. The method of claim 9, wherein the learning device performs the backpropagating by using a cross-entropy loss.

14. A sample image acquiring device for acquiring at least one sample image for label-inspecting among at least one auto-labeled image for learning a deep learning network, comprising:
at least one memory that stores instructions; and
at least one processor configured to execute the instructions to: perform processes of: (I) if the auto-labeled image labeled by an auto-labeling network is acquired, (i) generating a first image and a second image, at least one of which is transformed from the auto-labeled image, wherein if only one of the first image and the second image is transformed from the auto-labeled image then the other is the auto-labeled image used as is, (ii) instructing one or more convolutional layers to generate at least one first feature map and at least one second feature map by respectively applying one or more convolution operations to the first image and the second image, (iii) instructing one or more pooling layers to generate each of first pooled feature maps by respectively applying one or more pooling operations to each region, corresponding to each of auto-labeled boxes of the auto-labeled image, on the first feature map, and to generate each of second pooled feature maps by respectively applying the pooling operations to each region, corresponding to each of the auto-labeled boxes of the auto-labeled image, on the second feature map, and (iv) generating each of concatenated feature maps, corresponding to each of the auto-labeled boxes by concatenating each of the first pooled feature maps and each of the second pooled feature maps respectively corresponding to said each of the auto-labeled boxes, (II) instructing a deep learning classifier to acquire each of the concatenated feature maps as its input, to thereby generate class information which classifies each of the auto-labeled boxes into an abnormal class group or a normal class group, and (III) (i) calculating each of one or more probabilities of each of abnormal class elements in the abnormal class group by referring to each piece of the class information on each of the auto-labeled boxes, (ii) determining whether the auto-labeled image is a difficult image by using each of the probabilities of each of the abnormal class elements, and (iii) selecting the auto-labeled image as the sample image for label-inspecting if the auto-labeled image is determined as the difficult image, wherein the difficult image represents an image which has a probability of being automatically labeled incorrectly larger than or equal to a predetermined value.

15. The sample image acquiring device of claim 14, wherein, at the process of (I), the processor, in a process of generating the first image and the second image, generates at least one image pair of the first image and the second image corresponding to the auto-labeled image by using one or more transformation pairs which include one or more first functions for transforming the first image and their corresponding second functions for transforming the second image, and
wherein, at the process of (III), the processor, for each of the auto-labeled boxes, calculates each of probabilities of each of the abnormal class elements corresponding to each of the transformation pairs and calculates at least one weighted average over said each of probabilities.

16. The sample image acquiring device of claim 14, wherein the abnormal class group includes a misdetection class group and a non-detection class group, and each of probabilities of each of the abnormal class elements includes each of probabilities of each of misdetection class elements in the misdetection class group and each of probabilities of each of non-detection class elements in the non-detection class group.

17. The sample image acquiring device of claim 14, wherein, at the process of (III), the probability of being automatically labeled incorrectly is at least one generalized mean over each of one or more probabilities of each of the abnormal class elements.

18. The sample image acquiring device of claim 14, wherein the predetermined value is a highest hit rate among hit rates for correct answers to validation images which are manually inspected after auto-labeling of the auto-labeling network.

19. The sample image acquiring device of claim 14, wherein the processor further performs a process of:
(IV) identifying regions, corresponding to the auto-labeled boxes classified into the abnormal class group, on the auto-labeled image determined as the difficult image.

20. The sample image acquiring device of claim 14, wherein each of the convolutional layers is at least one auto-labeling convolutional layer in the auto-labeling network.

21. The sample image acquiring device of claim 14, wherein the deep learning classifier includes multiple fully connected layers or a fully convolutional network.

22. The sample image acquiring device of claim 14, wherein a learning device has instructed the deep learning classifier to complete processes of (i) if at least one training image including true boxes and auto-boxes corresponding to the auto-labeled boxes is acquired, (i-1) instructing a convolutional layer for training to generate a feature map for training by applying its convolution operations to the training image, and (i-2) instructing a pooling layer for training to generate pooled feature maps for training by applying its pooling operation to each of regions, corresponding to the auto-boxes, on the feature map for training, (ii) acquiring each of the pooled feature maps for training corresponding to each of the auto-boxes as its input and to generate the class information which classifies the auto-boxes into the abnormal class group or the normal class group, and (iii) instructing at least one loss layer to calculate one or more losses by referring to the class information and one or more ground truths, to thereby learn at least part of parameters of the deep learning classifier by backpropagating the losses.

23. The sample image acquiring device of claim 22, wherein the class information includes the abnormal class group having a misdetection class group and a non-detection class group,
wherein (i) the misdetection class group refers to a case that a first specific true box with the class information same as that of a first specific auto-box does not overlap with any other of the true boxes by a value equal to or greater than a first prescribed threshold and (ii) the non-detection class group refers to a case that, on condition that a second specific auto-box with the class information same as that of a second specific true box does not overlap with any other of the auto-boxes by a value equal to or greater than a second prescribed threshold, a third specific auto-box overlaps with the second specific true box by a value equal to or greater than a third prescribed threshold, and the normal class group includes any other class groups excluding the misdetection class group and the non-detection class group.

24. The sample image acquiring device of claim 23, wherein the learning device manages the misdetection class group, the non-detection class group, and the normal class group, such that the number of one of a class group, in the abnormal class group, with more group elements is equal to or less than the number of the other class group, in the abnormal class group, with less group elements multiplied by a predetermined first multiplier, and that the number of group elements of the normal class group is equal to the number of group elements of the abnormal class group multiplied by a predetermined second multiplier.

25. The sample image acquiring device of claim 23, wherein the learning device adjusts the number of group elements of the misdetection class group, the number of group elements of the non-detection class group, and the number of group elements of the normal class group by using a random sampling.

26. The sample image acquiring device of claim 22, wherein the learning device performs the backpropagating by using a cross-entropy loss.

\* \* \* \* \*